United States Patent [19]
Ernst

[11] 3,913,993
[45] Oct. 21, 1975

[54] ANTIFRICTION BEARINGS

[75] Inventor: Horst M. Ernst, Eltingshausen, Germany

[73] Assignee: SKF Industrial Trading and Development Company B.V., Amsterdam, Netherlands

[22] Filed: Nov. 21, 1973

[21] Appl. No.: 418,077

[30] Foreign Application Priority Data
Nov. 25, 1972 Germany............................ 2257861

[52] U.S. Cl. .................... 308/196; 192/45; 308/201
[51] Int. Cl.² ......................................... F16D 15/00
[58] Field of Search ........... 308/190, 201, 196, 197, 308/194; 192/45

[56] References Cited
UNITED STATES PATENTS
| | | | |
|---|---|---|---|
| 1,399,959 | 12/1921 | Hanson | 308/197 |
| 3,651,550 | 3/1972 | Bennett | 308/196 |
| 3,805,932 | 4/1974 | Ernst | 192/45 |

*Primary Examiner*—Lloyd L. King
*Assistant Examiner*—Richard A. Bertsch

[57] ABSTRACT

An antifriction bearing comprising an inner and outer ring between which a plurality of bearing elements are located. The elements are arranged in two parallel rows spaced from each other and a cage holding at least one row is interposed therebetween. The cage is provided with surfaces which engage the antifriction elements and which cause them to clamp against the races and stop from rotating in one direction. At least one of the cage, inner race and outer race members is divided in the radial direction and a resilient element is interposed between the divided portions to bias one portion with respect to the other.

9 Claims, 13 Drawing Figures

ANTIFRICTION BEARINGS

BACKGROUND OF THE INVENTION

The present invention relates to an antifriction bearing and in particular to a selectively operable free running and uni-directional bearing which limits rotation in one direction.

In the U.S. Pat. No. 3,805,932 issued Apr. 23, 1974, in which the present inventor is a co-inventor, an antifriction bearing is provided comprising an inner and outer ring in which two rows of antifriction bearing elements, such as balls, are located. At least one row of the antifriction bearing elements are retained in a cage having pockets for receiving the elements individually. The pockets are provided with a surface or ramp edge acting as a clamping means when the bearing is rotated in one direction. The cage and the roller elements such as balls are arranged so that the point or line of clamping between these members is offset from the axis of rotation of the antifriction element itself. the clamping surface or inclined surface of the cage acts on the antifriction elements so as to brace the elements against both the inner and outer race surfaces so as to form a triangular or three point clamping force on the ball directly. In addition to the use of balls as antifriction elements, cylindrical, or taper rollers may be used. The side of the antifriction elements opposite the inclined or slanted surface of the cage forming the clamping surface may be of convex design. The sides of the inclined surfaces forming the clamping surfaces can be convex in the axial direction. While the bearings described in the aforementioned co-pending application have had wide acceptance and are quite suited to their purpose, they are uni-directional.

It is an object of the present invention to provide an antifriction bearing of the type described having means for obtaining bi-directional rotation as well as uni-directional rotation.

It is another object of the present invention to provide a roller bearing of the type described which can selectively be placed under free rotation and with uni-directional or clamping action in both directions of rotation.

It is another object of the present invention to provide a roller bearing of the type described in which the rate of shift from free running to uni-directional braking is lessened, that it has a higher switching speed.

It is a further object of the present invention to provide an antifriction bearing which is greatly improved over those in the prior art.

These and other objects, as well as numerous advantages, will be apparent from the following disclosure of the preferred embodiments of the present invention.

SUMMARY OF THE INVENTION

According to the present invention a bearing is provided comprising an inner ring and an outer ring between which a plurality of antifriction bearing elements are located. The bearing elements are arranged in at least annular rows axially spaced from each other and are retained in a cage arranged between the rows. The cage has means for holding the bearing elements in at least one of the rows and clamping surfaces adapted to engage the bearing element to stop rotation of the bearing element in at least one direction. Broadly means are provided for resiliently biasing the antifriction bearing elements against the clamping surfaces. Preferably this is provided by dividing at least one of the cage and inner and outer race rings into two portions and locating a resilient spring-like component between the two portions.

Thus the two portions of the divided cage, inner race or outer race are axially movable with respect to one another so as to permit shifting of the clamping points with respect to the antifriction bodies between clamping and free running condition.

The means for resiliently biasing the portion can preferably be a spring which is either prestressed under tension or under compression. The means can also be a hydraulic or pneumatic piston and cylinder arrangement.

In one form of the invention a tension spring is arranged between two portions of the cage so that the anti-friction elements, of a double row bearing, are in constant contact with the cage. During rotation, in the clamping direction, a blocking or braking of the bearing thus will be accomplished. In this arrangement, the spring may be of the well known type such as a belleville or cup spring and its resilient properties, dependent upon the material used and the spring characteristics can be so chosen that the rate of shift from free running to braking condition can be acurately obtained for the purposes desired. In another embodiment of the present invention the resilient means may be arranged between the portions of the divided outer race ring and may be prestressed under tension so that bearing clearance between the outer race ring and the antifriction bodies can be eliminated. Thus, for instance, if a compressive force is caused to act on the axial ends of the outer ring, the two portions of the outer ring would be caused to move toward one another. With the appropriate design of the races, the clamping point may thus be varied under such compression so that the pole of the rotation axis of the antifriction element itself, and the clamping point, can coincide. Under these conditions no further clamping takes place and the bearing can transmit radial loads in both directions. The same effect can be obtained, in the reverse order, when a compressive spring component is arranged between the two halves of the inner race ring. Here too, the bearing will act as if "freely rotating" in the event of an axial divergent movement of the two portions of the inner ring, in the opposite directions. If the bearings are used under difficult conditions of movement, the spring components can be provided in both the inner and outer race rings and between the halves of the cage, so that a large number of clamping possibilities or free rotation of the shaft contained therein can be obtained in both directions.

In another form of the present invention the race rings may be radially divided and a sealed pressure chamber can be formed between the halves of the race ring. The race rings being shaped so as to form a cooperative piston and cylinder arrangement in which a hydraulic or pneumatic medium may be retained. The halves of the race ring may thus receive the impact afforded by a load placed on the bearing and to be absorbed in the hydraulic or pneumatic medium. As the spring components, and also the hydraulic medium will only act in one direction, it is advantageous that the actuating devices for the axial shift of the bearing ring race portions act in relationship to one another at the ends of the races. To accomplish this a threaded spindle may be used.

The bearings are adapted for use in supporting a shaft within the inner race ring or a bushing secured about the outer race ring. If the portions of the race rings are firmly seated on the shaft or in the bore of the bushing, the shaft or bore itself can be divided and a resilient or spring component can be located therebetween to insure the axial shiftinng of the race portions in relationship to one another.

Full details of the present invention and of the several preferred embodiments are set forth in the following description in which reference is made to the accompanying drawings.

DESCRIPTION OF THE INVENTION

Figure 1:
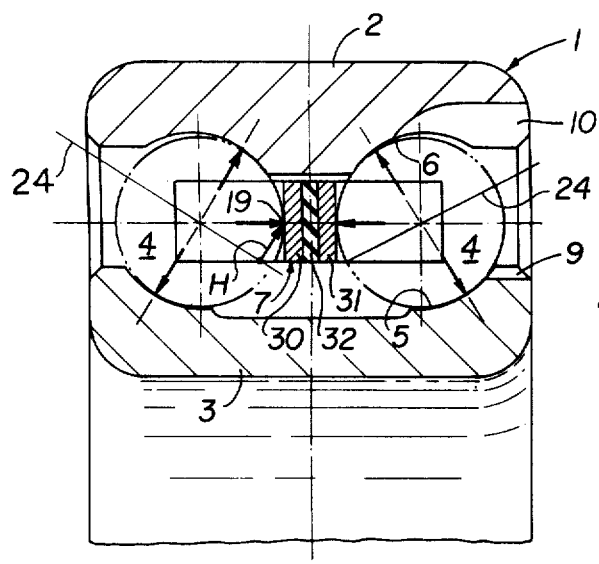
FIG. 1 is an axial cross-section through a portion of the bearing employing the present invention in which the cage is divided into two portions between which there is located an axially resilient spring component.

The embodiment depicted in FIG. 1 comprises a double row oblique ball bearing generally depicted by the numeral 1. The bearing 1 comprises an outer ring 2 and a concentric inner ring 3 between which a plurality of antifriction elements such as balls 4 are located in two parallel rows to ride on the radially inclined race surfaces 5 and 6 of the inner and outer race rings respectively. Each row of balls lies in a plane perpendicular to the axis of bearing rotation. The balls are held in a cage 7 which has opposed clamping surfaces 8 which, in this instance are the radial flanks of the pockets of the cage retaining the balls. The flanks or inclined surfaces are adapted to act on the balls in each row to cause the balls to engage the surface of the race ring and the cage. During the clamping action of the bearing the balls are supported in static position on the races 5 and 6 and on the clamping surface 8 in the three supporting points indicated by the heavy arrows radiating from the center of the balls 4 as seen in FIG. 1.

The cage 7 is a ring-like member, the upper and lower surfaces of which lie in parallel circular planes. The clamping surfaces are inclined faces or ramps or other shaped edge portions adapted to wedge against the antifriction ball elements. The frontal faces of the inner and outer race rings are provided with grooves 9 and 10 respectively which when aligned form a hole through which the balls may be inserted or removed from between the rings. The cage 7 is fitted in a radial direction between the outer surface of the inner ring 3 and the bore of the outer ring 2.

As seen in FIG. 1, which is an axial section through the bearing, the point 19 at which the balls 4 engage the clamping surfaces 8 is substantially along a line or axis which is parallel to the axis of bearing rotation. Because of the inclined race surfaces 5 and 6 the axis of rotation 24 of the balls 4 is offset by the distance H from the clamping point 19.

The cage of the embodiment shown in FIG. 1 is radially divided and thus comprises two half portions 30 and 31. Located between these two half portions 30 and 31 is a resilient biasing component 32 which has an axially outward tensioning bias forcing the half cage portions 30 and 32 into contact with the balls 4. The resilient component 32 may be any one of those spring components shown for example in FIGS. 5 through 8.

Figure 2:
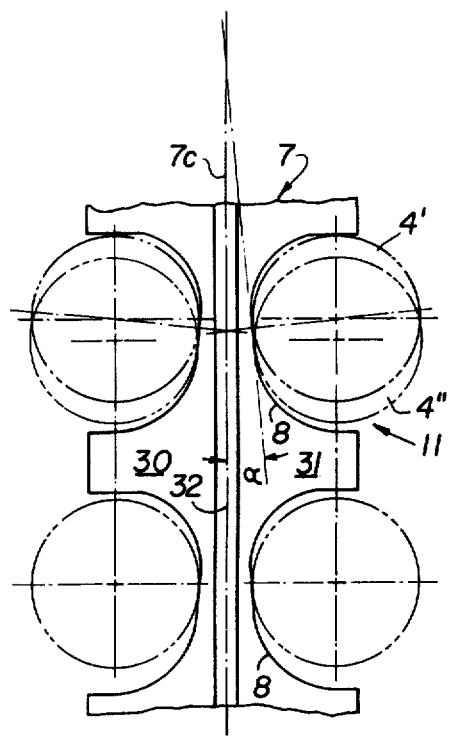
FIG. 2 is a planar development of the cage of the bearing of FIG. 1 showing the pockets for the antifriction elements and the clamping surfaces.

The development of the cage 7 is seen in FIG. 2 in plan view. It is formed with a series of curved pockets 11 uniformly spaced along each of the axial edges of the divided half portions 30 and 31. Each of the pockets 11 have circular curved sides against which the balls 4 are adapted to rotate and a generally flattened bottom surface forming the inclined clamping surface 8. The flattened clamping surfaces are offset from the transverse axis 7c of the cage by an angle $\alpha$ so that in addition to its flatness it is also inclined with respect to the axial direction of the bearing. The spring component 32 is arranged between the half portions of the cage 30 and 31. The spring component insures the axial divergence of the cage components against the antifriction bodies so that any axial clearance of the antifriction elements in the pockets is extremely small. Thus the shift speed of the clamping device is greatly increased. In FIG. 2 the pockets 11 and the inclined clamping surfaces 8 for both rows of balls are arranged opposite one another. The balls are depicted in the FIGURE in their running position by the numeral 4' and in their clamping position by the numeral 4''. The pockets 11 can be arranged so that they are offset from each other in the manner suggested in the aforementioned co-pending application.

Figure 3:
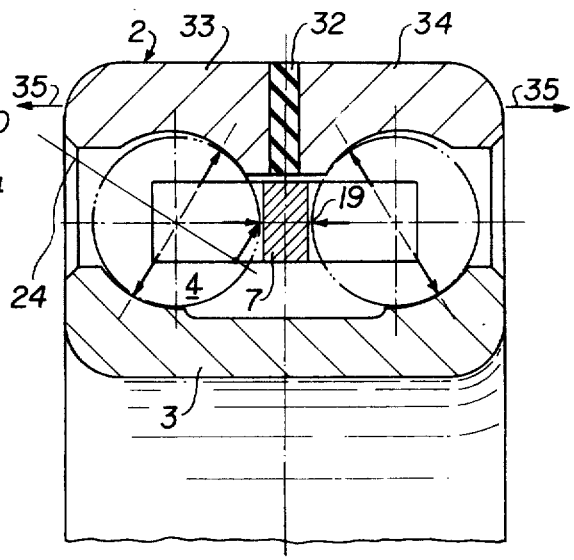
FIG. 3 is an axial section through a bearing employing another embodiment of the present invention in which the resilient component is arranged between two portions of the outer race ring.

In FIG. 3 another form of the present invention is depicted wherein the bearing generally shown in FIG. 1 is formed so that the outer race ring is divided into two half portions 33 and 34. The resilient tension component 32 is located between the half portions 33 and 34 so as to normally bias the half portions axially outward in the direction of the arrows 35. Because of the axial movement in the direction of the arrows 35, the bearing is prestressed and the bearing clearance is equal to zero. Should the portions of the outer race ring be loaded with axial movement in the direction opposite to the arrows 35, the relative positions of the balls 4 and the race surfaces 5 and 6 will shift so that the clamping point 19 will form the bisector of the angle between the two points of contact of the antifriction element on the race surfaces 5 and 6. When this occurs there is no longer any clamping action on the antifriction balls and the bearing is permitted to rotate freely in both directions of bearing rotation. Otherwise the bearing of FIG. 3 is structured and functions in the same manner as that of FIG. 1.

Figure 4:
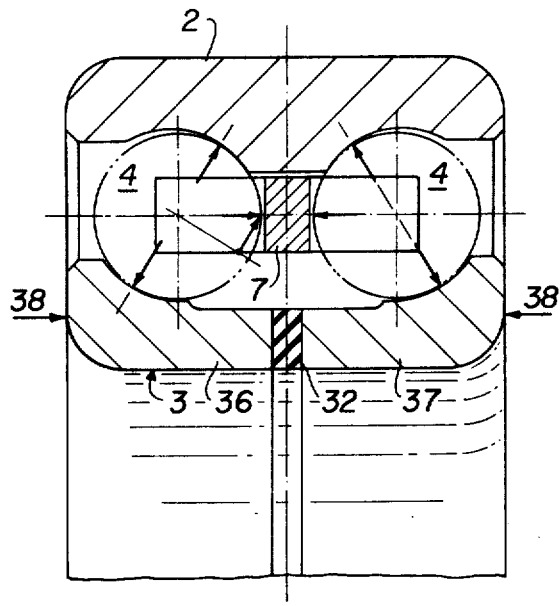
FIG. 4 is a view similar to FIG. 3 showing a further embodiment of the present invention wherein the resilient component lies between the two portions of the inner race ring.
Figure 9:
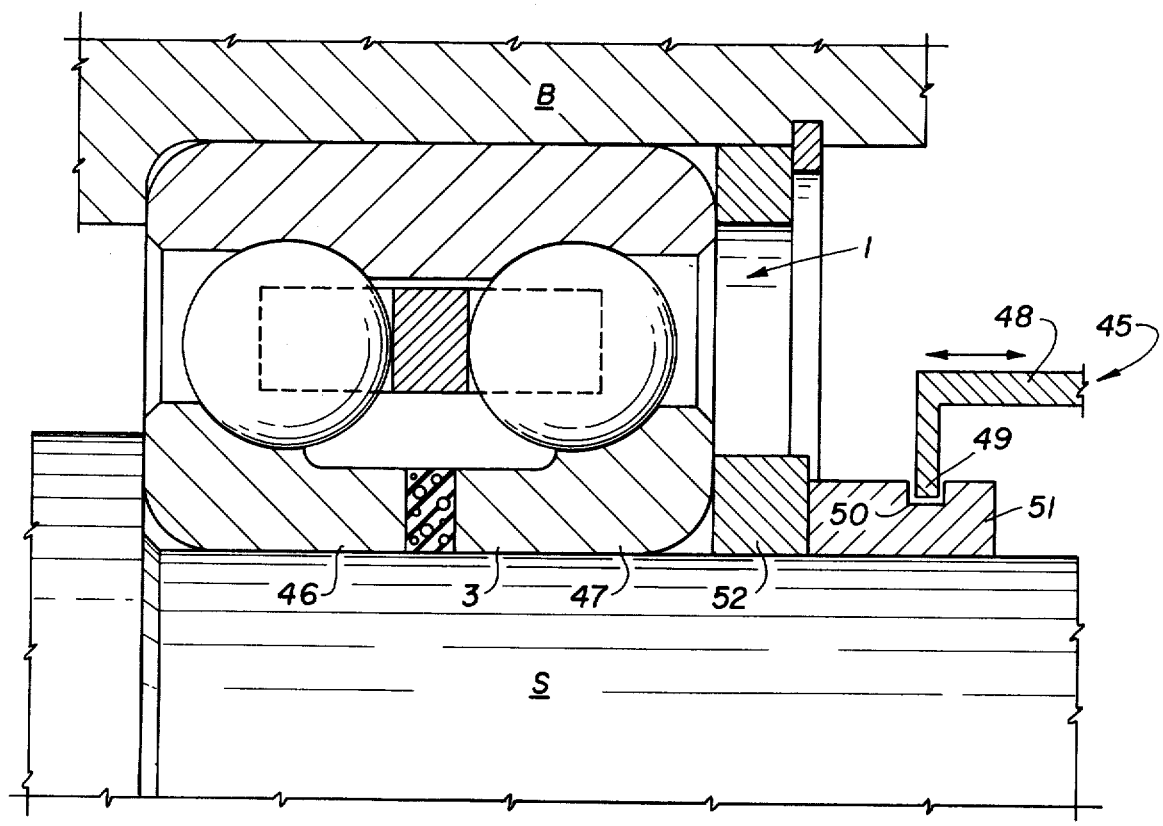
FIG. 9 depicts an arrangement for the axial shifting of two inner race ring portions in relationship to one another.

A design similar to that shown in FIG. 3 is shown in FIG. 4 except that the inner race ring 3 is divided into two portions 36 and 37. The portions 36 and 37 are symmetrical and half portions of the inner race ring. A compressive resilient member 32 is located between these half portions 36 and 37. Compressive forces are provided acting at the ends of the inner race ring along the direction of the arrows 38. In this manner the bearing is kept prestressed so that the inner race ring acts against the balls 4 and the bearing is prestressed in clamped condition. If the two portions of the inner ring 36 and 37 respectively are allowed to push away from each other in the axial direction, the bearing elements or balls 4 are then permitted to rotate freely in both directions of rotation. Reference later to FIG. 9 will be made to show the means for shifting the bearing of this type.

Figure 5:
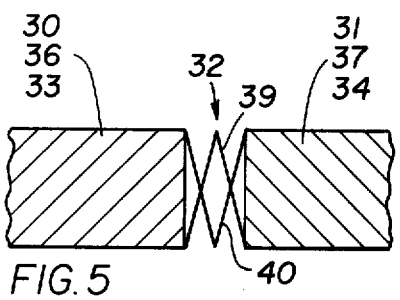
FIGS. 5 through 8 show examples of resilient components acting in axial directions and located between the two portions of the cage or race rings.
Figure 6:
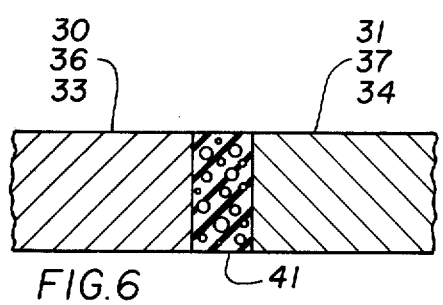
Figure 7:
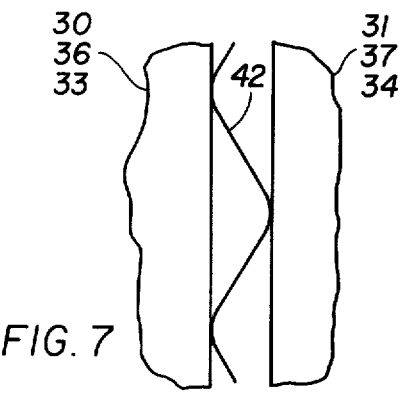

FIGS. 5 through 7 show partial sections through the divided or split portions of the cage and/or outer and inner race members. These FIGURES are illustrative of the type of spring or resilient components that may be used with any one of the cage, inner race ring or outer race ring members. Each of the FIGURES contain multiple numerals showing that for the purpose of illustration the portions shown are interchangeable. In FIG. 5 cup springs 39 and 40 are illustrated. These cup springs may be double belleville springs or the like. FIGURE 6 depicts a resilient rubber or plastic block 41 which may be foamed or in dense condition.

FIG. 7 depicts in plan view the layout of the cage or race ring portions between which a wavy or sinuous spring 42 of steel, plastic, or other flexible but largely rigid material is employed. The spring component shown in FIGS. 5 through 7 are preferably of semicircular design, although they may be of annular split ring design as well.

Figure 8:
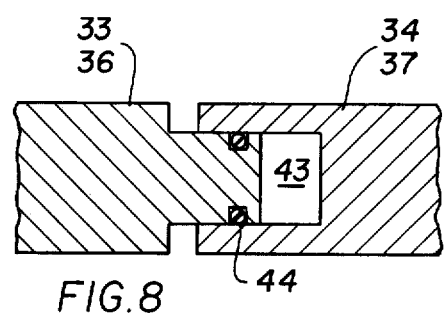

FIG. 8 shows the race rings divided into portions 33, 34 and 36-37 which are formed into inter engaging piston and cylinder pneumatic or hydraulic pressure components. A chamber 43 is provided in one of the ring portions while the outer portion is formed in the shape of a piston and is provided with a piston ring 44 which seals the same. The chamber 43 may be filled with a hydraulic or pneumatic medium by conventional means. In the arrangement shown in FIG. 8 the piston and cylinder form a constant dashpot in which a suitable spring constant may be provided by regulating the pressure of the hydraulic or pneumatic medium contained in the chamber 43. The chamber 43 may be connected to a source or supply of pressurized medium as for example a reservoir or a pump.

In FIG. 9 the bearing, of the type generally depicted in FIG. 4 is shown in operative condition wherein the inner race ring is fixed about a shaft S while the outer race ring is fixed within a bushing B. The inner race ring is divided into two portions 46 and 47 between which is interposed a resilient member of the type described earlier. An actuating device, generally depicted by the numeral 45, is employed for the axial movement of the portions 46, 47 of the divided inner ring. The actuating device 45 consists of a fork member 48 having an end engaged in a annular ring shaped groove 50 formed on the outer surface of a sleeve 51 shiftably arranged on the outer surface of the shaft S. The fork 48 is connected to an actuating mechanism and is itself shiftable in the reciprocal directions indicated by the double arrow. The axial movement of the fork 48 is transmitted via the sleeve 51 to a ring 52 interposed between the sleeve 51 and the inner race ring portion 47. Shifting the fork 48 to the left as seen in FIG. 9 would compress the resilient member interposed between the race ring portions 46 and 47 and provide the compressive force indicated by the arrows 38 in FIG. 4. This would provide a clamping action on the balls 4 of the bearing. On the other hand shifting the fork 48 to the right as seen in FIG. 9 would release the clamping action and permit the balls to rotate freely running condition in either direction.

A C-clamp is provided to hold the elements in space and to permit the axial movement. Similar actuating mechanisms to the one depicted in FIG. 9 may be employed to actuate or provide the compressive or attention bias on any one of the bearings shown in FIGS. 1 through 3 as will of course be apparent to those skilled in the present art.

Figure 10:
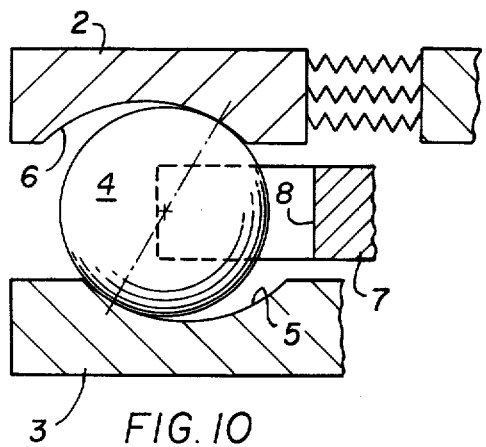
FIGS. 10 and 11 depict a deep grooved ball bearing with inclined clamping surfaces, the outer ring being axially movable in relationship to the inner race ring.
Figure 11:
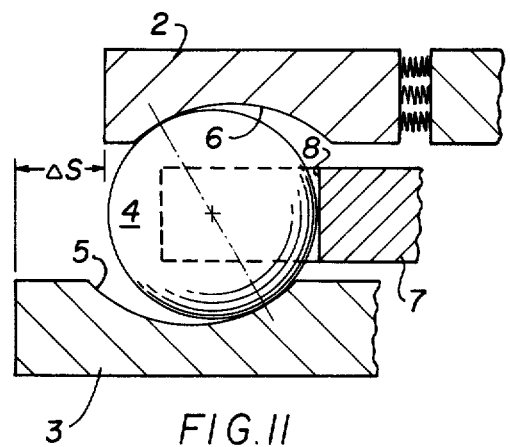

FIGS. 10 and 11 show in cross section portions of deep groove ball bearings in which the outer race ring is divided and supplied with the resilient biasing member between the divided sections. The outer race ring is thereby shiftable with respect to the inner race ring 3 by an amount indicated by the factor $\Delta_r$. By shifting the outer race portion 2 as seen in FIG. 10 to the left free rotation of the ball 4 is provided since no clamping action in the triangular array or three point supporting clamping configuration previously described is provided here. It will be observed that in FIG. 10 the ball is spaced from the incline or clamping surface 8 of the cage 7. And the ball rides freely on the race surfaces 5 and 6. However, in shifting the outer race ring 2 so as to compress the resilient member as indicated in FIG. 2, by the factor $\Delta_r$, the balls 4 are caused to shift into engagement with the clamping surface 8 of the cage 7 as well as with the race surfaces 5 and 6. This of course provides the triangular array of supporting and clamping points and results in braking of the bearing in one directionof rotation.

Figure 12:
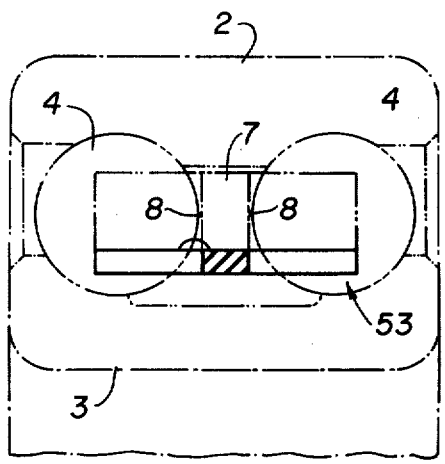
FIGS. 12 and 13 are views similar to FIGS. 1 and 2 showing a bearing according to a further embodiment of the present invention wherein the resilient biasing of the antifriction elements is performed by means of an attachment fastened to the cage.
Figure 13:
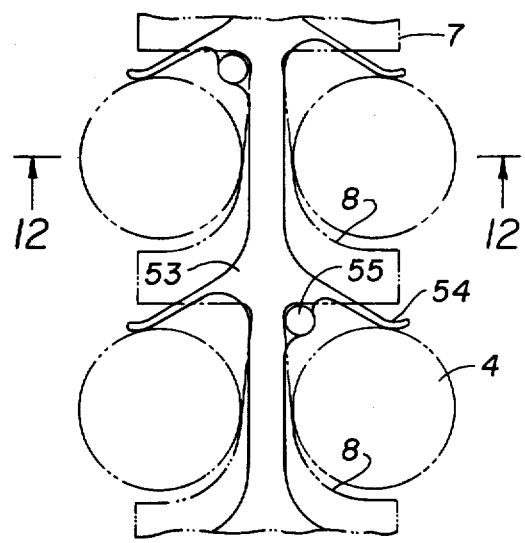

FIGS. 12 and 13 depict still a further embodiment of the present invention wherein the resilient component comprises an additional or auxiliary member 53 mounted about the inner surface of the cage 7. The part 53 is an annular ring having angularly extending tongues extending generally axially outward to both sides of the cage 7 and inward toward the pockets of the cage. The tongues 54 press the antifriction ball elements 4 in a generally transverse direction as indicated in FIG. 13 whereby the balls are moved to engage against the clamping surfaces 8. The tongues 54 extend outwardly at such an angle that the balls are generally resiliently biased so that a high shift speed is easily obtained during the clamping action. The additional member 53 is fastened to the cage 7 by means of radially inwardly directed pins 55.

From the foregoing it will be seen that the effect of the present invention is generally obtained by providing a bearing of the type described with means for resiliently biasing the bearing elements against the clamping surface. Preferably this is obtained by splitting or dividing either the cage, the inner and/or outer rings or any combination thereof into two portions and interposing a resiliently biasing member such as a spring or rubber pad between these portions and by providing means outside of the bearing for prestressing or stressing the divided members under conditions of operation. As seen in FIG. 12 the bearing members need not be divided but a resilient member having a bias directing the balls 4 against the clamping surface can be provided instead. In general, the bearings depicted herein are of the type described in the aforementioned patent to which reference can be made as if the same had been more fully described and incorporated herein. Various changes and modifications have been illustrated in the present disclosure. Other embodiments and changes will be apparent to thos skilled in the art. Accordingly it is intended that the present disclosure be taken as illustrative only and not as limiting of the scope of the present invention.

What is claimed:

1. A bearing comprising inner and outer race rings, a plurality of antrifriction bearing elements positioned therebetween and arranged in two annular rows axially spaced from each other, a cage arranged between said rows provided with means for holding the bearing elements in at least one row and having clamping surfaces thereon adapted to engage said bearing elements for selective clamping of said elements between same and said inner and outer race rings, resilient means being provided in association with at least one of said cage and inner and outer race rings for resiliently biasing said bearing elements against said clamping surfaces to thereby stop rotation of said bearing elements in a selected direction.

2. The bearing according to claim 1 wherein the bearing elements are balls and the rings are formed with inclined race surfaces for each of the rows of balls.

3. The bearing according to claim 2 wherein the resilient bias causes the balls to be engaged in a triangular point array, one point being on the clamping surface, one point on the race of the outer ring and one point being on the race of the inner ring.

4. A bearing according to claim 1, wherein the clamping surfaces of said cage are adapted to engage said bearing elements in the axial direction in one direction of bearing rotation, at least one of said cage, inner and outer race ring being axially divided, said resilient means being arranged between the divided portions for resiliently biasing said portions in an axial direction with respect to one another.

5. The bearing according to claim 4 wherein said means for resiliently biasing said portions comprises a spring.

6. The bearing according to claim 4 wherein said means for resiliently biasing said portions comprises a sealed pressure chamber and piston arrangement.

7. The bearing according to claim 4 wherein said means for resiliently biasing said portions comprises a resilient block.

8. The bearing according to claim 4 wherein at least one of said race rings is divided and including an actuating device for axially shifting the portions of the divided race rings in relative to one another.

9. The bearing according to claim 1 wherein said means for resiliently biasing said bearing elements comprises an annular member secured to the surface of said cage, said annular member having extending tongues resiliently engaging the antifriction elements and biasing the same against the clamping surface.

* * * * *